United States Patent [19]

Suyama

[11] Patent Number: 4,611,561
[45] Date of Patent: Sep. 16, 1986

[54] AUTOMATIC SPEED CONTROL SYSTEM FOR MOTORCYCLES

[75] Inventor: Koji Suyama, Hamamatsu, Japan

[73] Assignee: Yamaha Hatsudoki Kabushiki Kaisha, Hamamatsu, Japan

[21] Appl. No.: 645,485

[22] Filed: Aug. 29, 1984

[30] Foreign Application Priority Data

Aug. 31, 1983 [JP] Japan ................... 58-160039

[51] Int. Cl.⁴ .................. F02D 11/08; F02D 41/14
[52] U.S. Cl. ........................ 123/360; 180/175
[58] Field of Search ........... 123/349, 350, 360, 376, 123/378, 389; 180/175–179, 170; 74/506, 489

[56] References Cited

U.S. PATENT DOCUMENTS 3,997,019 12/1976 Inoue ................... 123/376
4,245,713 1/1981 Mochida et al. ............ 180/176
4,364,283 12/1982 Ricardo .................. 74/506

FOREIGN PATENT DOCUMENTS 2059229 1/1973 Fed. Rep. of Germany ...... 123/389
2101363 1/1983 United Kingdom ............ 123/350

Primary Examiner—William A. Cuchlinski, Jr.
Attorney, Agent, or Firm—Ernest A. Beutler

[57] ABSTRACT

An automatic speed control mechanism for motorcycles or the like having a wire operating mechanism for positively connecting the accelerator grip to the throttle control of the engine. The automatic speed control includes a vacuum operated motor that is connected to the throttle wire system through a lost motion connection so that the manual throttle operation can operate unencumbered by the automatic speed control system.

5 Claims, 6 Drawing Figures

4,611,561

AUTOMATIC SPEED CONTROL SYSTEM FOR MOTORCYCLES

BACKGROUND OF THE INVENTION

This invention relates to an automatic speed control system for motorcycles and more particularly to an improved arrangement for coupling the automatic actuator to the throttle control mechanism.

The use of automatic speed control devices, commonly called cruise controls, has been widely accepted with automobiles. With automatic speed control devices for automobiles, an automatic actuator is employed that operates on the throttle mechanism for controlling the position of the throttle mechanism independently of the operator control. With an automotive application, it is the normal practice for the operator to remove his foot from the accelerator pedal during automatic throttle control. This greatly simplifies the arrangement whereby the automatic control is coupled into the throttle mechanism.

Many of the advantages of automatic speed controls in automotive applications apply equally as well to motorcycles. In addition, there are still further advantages in providing automatic speed control for a motorcycle than those in automobiles. However, with a motorcycle, the throttle control is normally provided on a rotatable accelerator grip and it is the practice for the operator to hold this grip even in the automatic speed control mode. Therefore, it is essential that the automatic device be coupled to the throttle mechanism in such a way as to not adversely affect the operation of the hand accelerator grip and so as to reflect the condition that the operator will normally maintain his hand on the grip even under automatic mode of operation.

It is, therefore, a principal object of this invention to provide an improved automatic speed control device for a motorcycle.

It is a further object of this invention to provide an automatic speed control device for a motorcycle wherein the automatic control is operative on the throttle mechanism in such a way so as to not interfere with normal throttle actuation.

SUMMARY OF THE INVENTION

This invention is adapted to be embodied in an automatic speed control mechanism for a motorcycle or the like comprising a throttle movable in opening and closing directions for controlling the speed of the motorcycle, an operator actuated speed control movable in opening and closing directions, and connecting means including a rotatable control element for positively coupling the operator actuated speed control to the throttle for opening and closing the throttle. The automatic speed control includes an actuator for automatically positioning the throttle and which is operative to drive an actuator element that is rotatable relative to the control element. Means provide a lost motion connection between the actuator element and the control element so that the control element may be freely operated by the operator in the manual mode and so that the actuator element can rotate the control element in the automatic mode.

DETAILED DESCRIPTION OF THE PREFERRED EMBODIMENT

Figure 1:
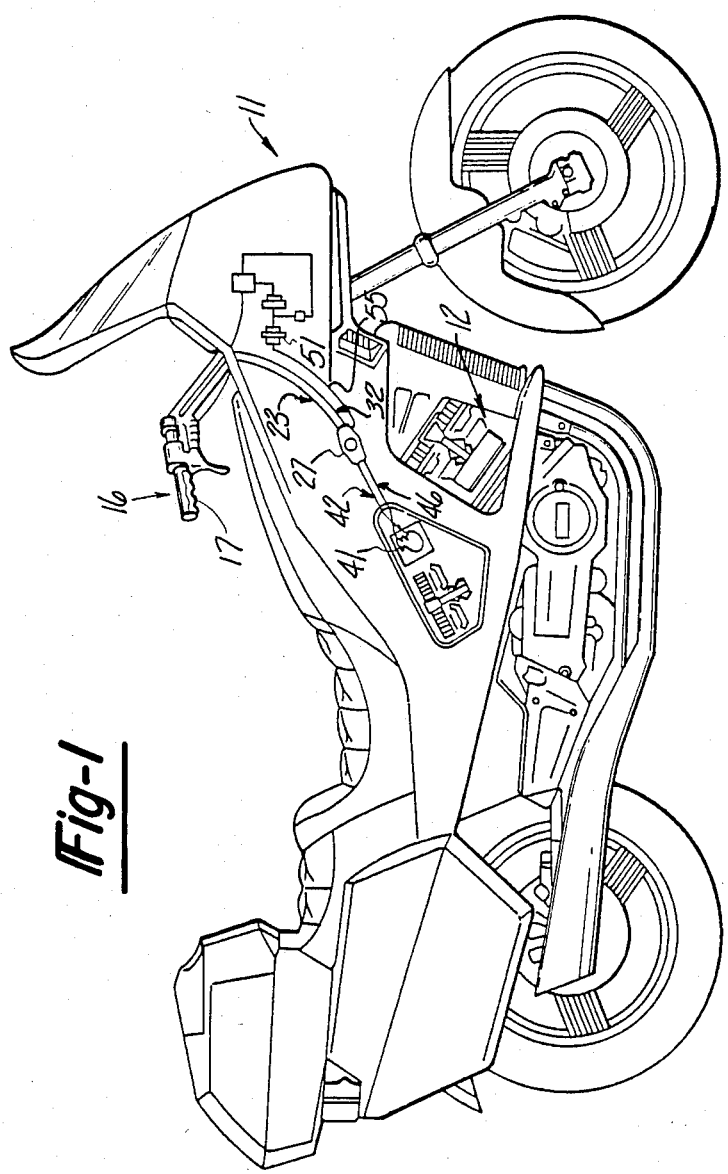
FIG. 1 is a side elevational view of a motorcycle having an automatic speed control mechanism constructed in accordance with an embodiment of the invention.

In the drawings, the reference numeral 11 indicates generally a motorcycle having a speed control mechanism constructed in accordance with the invention. The motorcycle 11 includes an engine, indicated generally by the reference numeral 12, which has an engine speed control device. In the illustrated embodiment, the engine 12 is of the type that includes one or more carburetors, indicated generally by the reference numeral 13, and which includes a throttle valve 14 that is rotatably journaled on a throttle valve shaft 15 for controlling the speed of the associated engine 12 in a known manner.

The motorcycle 11 is equipped with a handbar assembly 16 that carries at one of its ends a rotatable accelerator grip 17. The accelerator grip 17 is juxtaposed to a control box 18 that contains a speed control switch 19 and a kill switch 21. The kill switch 21 is provided for selectively disabling or stopping the engine 12. The speed control switch 19, as will become apparent, is operative to control an automatic speed control for controlling the speed of the engine 12 in a manner to be described.

Within the control box 18, the accelerator grip 17 is provided with a cam member 22 that is rotatably affixed to the accelerator grip 17. A throttle opening control wire 23 is provided that is comprised of a wire actuator 24 that has one of its ends affixed to the cam 22, as by a ferrule 25. The bulk of the length of the wire 24 is surrounded by a protective sheath 26. The opposite end of the wire 24 passes into a coupling device, indicated generally by the reference numeral 27, and which includes a rotatable control member 28. This end of the wire 24 is affixed to the rotatable control member 28, as by means of a ferrule 29. In this way, motion may be transmitted from the accelerator grip 16 to the control member 28 in a throttle opening direction, as will be described. The coupling device 27 includes an outer housing 30 that has a central post 31 that enters into a crresponding bore of the control member 28 so as to rotatably journal it.

A throttle closing wire, indicated generally by the reference numeral 32, has a wire actuator 33 which is connected at one of its ends to the cam 22 by means of a ferrule 37. Like the throttle opening wire actuator 23, the major portion of the length of the control wire 36 is encircled by a protective sheath 38. The opposite end of the throttle closing wire 36 is connected to the control member 28 by means of a ferrule 39.

Figure 3:
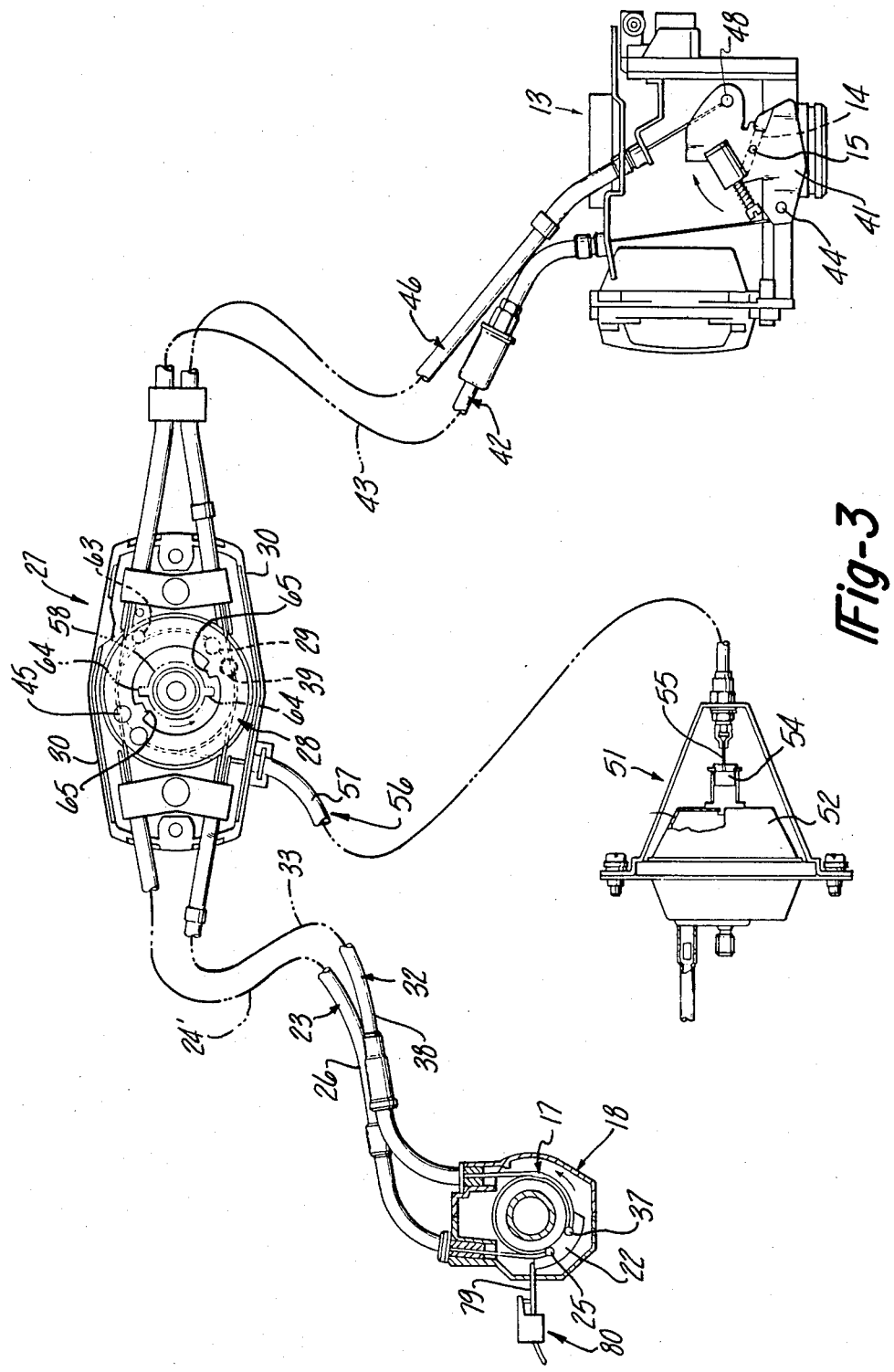
FIG. 3 is a partially schematic perspective view showing the construction of the throttle actuating mechanism of the embodiment.
Figure 4:
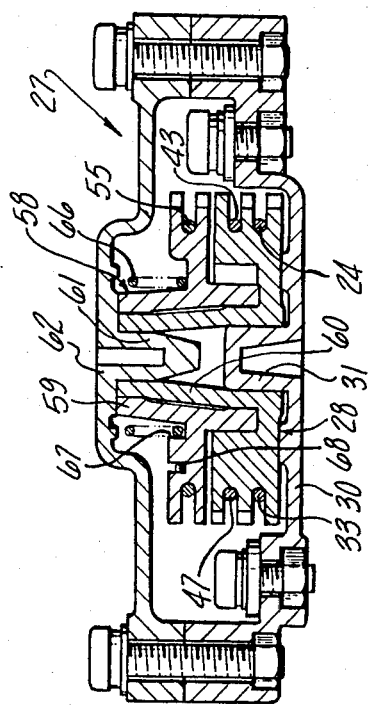
FIG. 4 is a cross-sectional view taken through the accelerator coupling device.

Rotation of the accelerator grip 16 in a counterclockwise direction as viewed in FIG. 3 places a tension on the throttle opening wire 24 which will rotate the control member 28 also in a clockwise direction. This direction is indicated by the solid arrow in FIG. 3. Rotation in the opposite direction will tension the throttle closing wire 36 and will rotate the control 28 in a throttle closing direction.

An actuating lever 41 is affixed to the throttle valve shaft 15 for rotatably positioning the throttle valve 14. A throttle opening control wire, indicated generally by the reference numeral 42, has a control wire 43 that is affixed at one of its ends to the lever 41 by means of a ferrule 44. The opposite end of the throttle opening control wire 43 is affixed to the control member 28 by means of a ferrule 45.

A throttle closing control wire assembly, indicated generally by the reference numeral 46, has a throttle closing control wire 47 that is affixed at one end to the lever 41 at a point spaced on the opposite side of the ferrule 44 by means of a ferrule 48. In addition, a throttle closing return spring (not shown) is provided that is operative on the lever 41 for biasing the throttle valve 14 to its closed or idle position. The opposite end of the throttle closing control wire 47 is affixed to the control member 28 by means of a ferrule 49.

Because of the aforedescribed connection, rotation of the control member 28 in a counterclockwise direction causes a tension to be exerted on the throttle opening control wire 43 so as to rotate the lever 41 and throttle valve 14 in a clockwise or opening direction. Clockwise rotation of the control member 28 will cause the throttle closing control wire 47 to be tensioned and rotate the lever 41 and throttle valve 14 in the closing direction. As has been previously noted, this rotation is also assisted by the return spring. It should be readily apparent, therefore, that a positive connection is provided between the accelerator grip 17 and the carburetor throttle valve 14 so that these two elements will be interdependent upon each other for their positioning.

In accordance with the invention, the motorcycle 11 is also provided with an automatic speed control including an actuator device, indicated generally by the reference numeral 51. The actuator device 51 is comprised of a vacuum motor 52 that includes a diaphgram 53 that is connected by means of a connector 54 to one end of a control wire 55 of a automatic control wire assembly, indicated generally by the reference numeral 56. The major portion of the length of the control wire 55 is encircled by a protective sheath 57. The opposite end of the control wire 55 extends into the coupling device 27 and is specifically connected to an actuating element 58 that is journaled within the housing 31 for rotation relative to the control member 28.

The actuating element 58 has a hub portion 59 that is journaled on an extending hub portion 60 of the control member 28. This portion 60 of the control member 28 is journaled on an extending projection 61 of a cover 62 of the housing assembly of the device 27. Hence, the members 28 and 58 are journaled within the housing consisting of the housing member 30 and the cover 62 for relative rotation about common axes. A ferrule 63 provides the connection between the actuating wire 55 and the actuating element 58.

The actuating element 58 is provided with a pair of lugs 64 that are adapted to engage, at times, lugs 65 formed on the control member 28. The lugs 64 and 65 provide, in effect, a lost motion connection between the actuating element 58 and the control member 28 so that the control member 28 may freely move in a throttle opening direction without interference from the actuating element 58. However, rotation of the actuating element 58 in the throttle opening position will cause the lugs 64 to engage the lugs 65 and to open the throttle valve 14 in a manner to be described.

Figure 5:
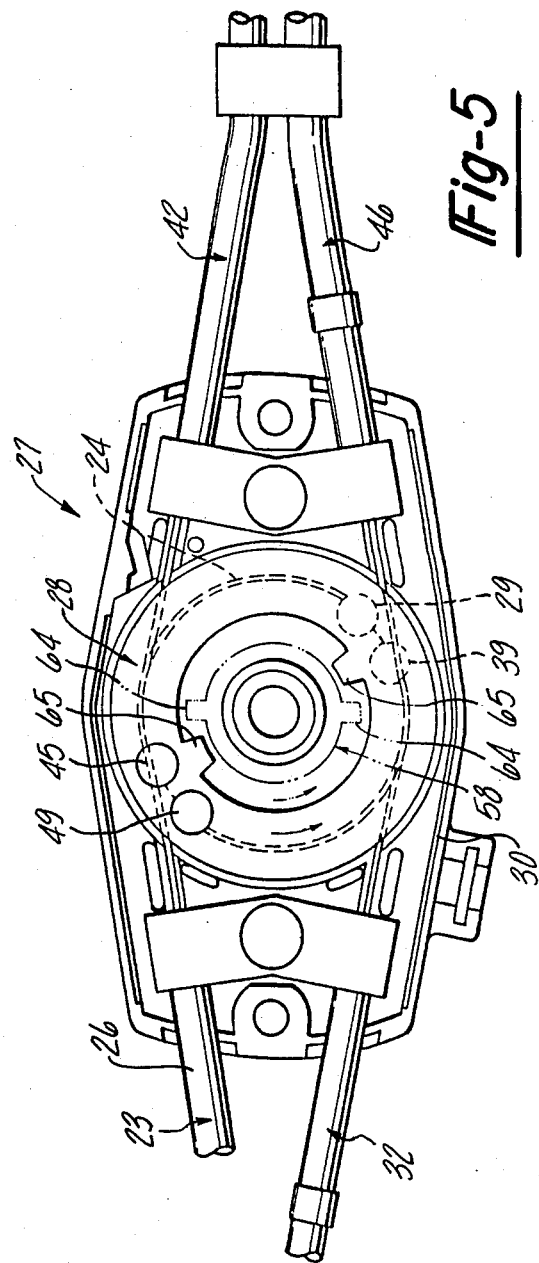
FIG. 5 is an enlarged top plan view of the coupling device with certain components removed.
Figure 6:
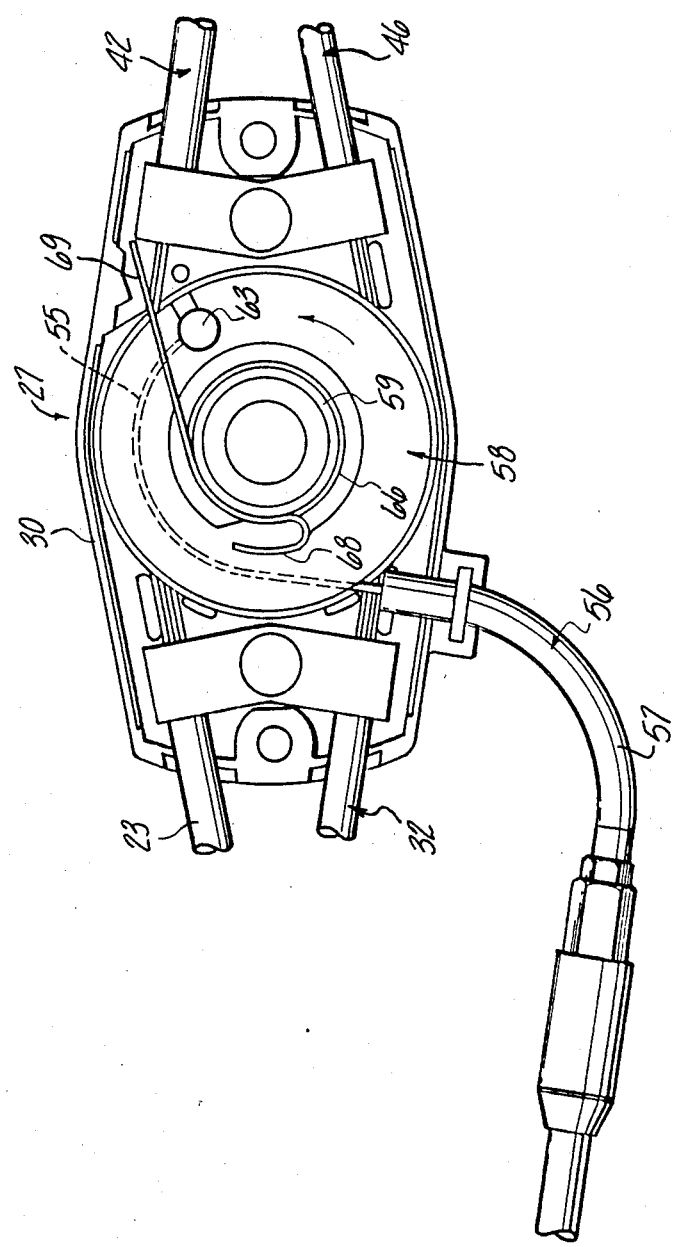
FIG. 6 is an enlarged top plan view, in part similar to FIG. 5, showing the removed parts reinstalled.

The actuating element 58 is normally biased to a deactivated position by means of a torsional spring 66. The torsional spring 66 is received within a recess 67 formed in the upper end of the actuating device 58 and has one of its ends 68 wrapped around a groove in the actuating device 58 so as to affix this end to it. An opposite end 69 engages the cover 62 of the housing of the connecting device 27 so as to complete the torsional effect. As aforenoted, the spring 76 normally acts so as to bias the actuating device 58 to an inoperative position in which the lugs 64 are spaced from the lugs 65 as shown in FIG. 5 when the throttle valve of the carburetor is in its idle condition.

Figure 2:
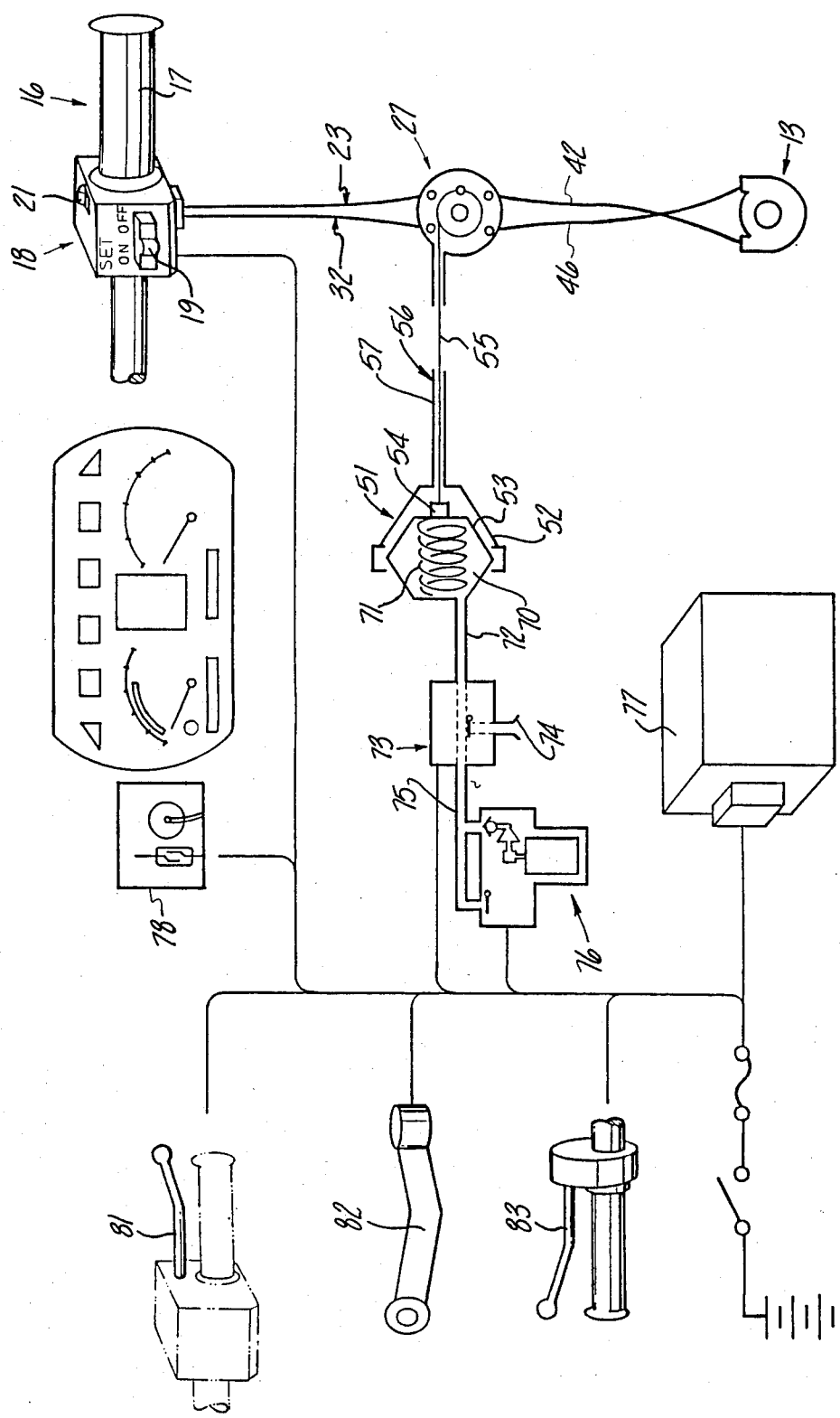
FIG. 2 is a partially schematic view showing the automatic speed control mechanism and its various controls.

Referring now primarily to FIG. 2, the actuating device 51 and specifically the diaphgram 53 forms a chamber 70 in which a coil compression spring 71 is contained for normally urging the diaphgram 53 in a throttle closing direction. The chamber 70 is connected to a conduit 72 which extends from a control valve assembly 73. The control valve assembly 73 is adapted to connect the conduit 72 to either an atmospheric vent 74 or a vacuum line 75. The vacuum line 75 is fed by an electrically operated vacuum pump 76. The vacuum pump 76 and control valve 73 are controlled by a control box 77 that is operative so as to control the vacuum pump 76 and valve 73 when actuated so as to maintain a preset vehicle speed.

This is achieved in the following manner. When the operator decides to control the motorcycle 11 in an automatic speed control mode, the set switch 19 is closed. At this time a comparator, indicated generally by the reference numeral 78, will note the actual speed of travel of the motorcycle 11 and provide a signal to the control box 77 of the preset speed. The vacuum pump 76 and control valve 73 will then be set so as to actuate the vacuum motor 52 and move the diaphragm 53 so that the wire 55 is tensioned and rotates the actuating element 58 so as to rotate the control member 28 to maintain the throttle valve 14 in the preset position necessary to maintain the desired vehicle speed. The mechanism for achieving this control is well known and, therefore, is not described in any further detail.

It should be noted that the vacuum motor 52 exerts sufficient force on the control member 28 and on the throttle valve 15 so as to overcome the force of the return spring. Thus, it is possible to maintain automatic speed control under this mode.

If the operator desires to deactivate the automatic speed control, this may be done in any of a number of ways. In addition, the operator can override the automatic speed control and cause deceleration of the engine 12 and motorcycle 11 even when still operating in the automatic mode. This later operation will be described first.

As has been previously noted, the accelerator grip 17 is directly coupled to the throttle valve 14 through the control wire arrangement previously described. Thus, if the operator rotates the accelerator grip 17 in a throttle closing direction, even when the automatic speed control is engaged, the throttle closing wire 46 will be tensioned and the control member 28 will be rotated in a clockwise direction. This is possible since the force exerted by the operator control is greater than the force exerted by the automatic speed control and specifically the vacuum motor 52.

If the operator wishes to completely deactivate the automatic speed control, he need merely rotate the accelerator grip 17 to the idle position wherein the cam 22 will engage a contact 79 of a disable switch 80 of the speed control. Then, the control unit 77 will be automatically deactivated. This switch 80 is contained within the control box 18 and is sealed within it.

In addition to the disabling of the automatic speed control by moving of the manual throttle to its idle position, it is also possible to disable it by operating the front hand brake control 81, the rear brake control 82 or the clutch control 83. These disabling switches are all of a known type and are operated in the control circuit with the control box 77 in a known manner.

It should be readily apparent that the described arrangement permits a very effective speed control for a motorcycle and further permits the operator to manually override the speed control and reduce the speed of the vehicle without disabling the automatic speed control. In addition, the automatic speed control may be switched off in any of a plurality of manners. When this is done, the control device 77 shuts off the vacuum pump 72 and opens the valve 73 to the atmospheric vent 74 so as to disable the vacuum motor 52.

Although an embodiment of the invention has been illustrated and described, various changes and modifications may be made without departing from the spirit and scope of the invention, as defined by the appended claims.

I claim:

1. An automatic speed control mechanism for a motorcycle or the like comprising a throttle operable in opening and closing directions for controlling the speed of the motorcycle, an operator actuated speed control movable in an opening and closing direction, connecting means including a rotatable control element and separate opening means and closing means for positively coupling said operator actuated speed control to said rotatable control element for positively rotating said control element in throttle opening and closing directions, separate opening and closing means for positively coupling said control element to said throttle for positively opening and closing said throttle, actuator means for automatically positioning said throttle, said actuator means being operative to drive an actuator element rotatable relative to said control element, and means for providing a lost motion connection between said actuator element and said control element for permitting movement of said control element independently of said actuator element and for operation of said control element by said actuator element upon movement of said actuator element by said actuator means.

2. An automatic speed control mechanism as set forth in claim 1 wherein the connecting means comprises a housing rotatably journaling said control element and said actuator element for rotation about a common axis.

3. An automatic speed control mechanism as set forth in claim 2 wherein the lost motion connection comprises interengaging lugs on the control element and the actuator element.

4. An automatic speed control mechanism as set forth in claim 3 wherein the separate throttle opening means and throttle closing means of the connecting means comprises a throttle opening cable operatively connected between said operator actuated speed control and said control element and a throttle closing wire operatively connected between said operator actuated speed control and said control element and a throttle opening wire operatively connected between said control element and said throttle and a throttle closing wire operatively connected between said control element and said throttle.

5. An automatic speed control mechanism for a motorcycle or the like comprising a throttle operable in opening and closing directions for controlling the speed of the motorcycle, an operator actuated speed control movable in an opening and closing direction, connecting means including a rotatable control element for positively coupling said operator actuated speed control to said throttle for opening and closing said throttle, a throttle opening cable operatively connected between said operator actuated speed control and said control element and throttle closing wire operatively connected between said operator actuated speed control and said control element and further including a throttle opening wire operatively connected between said control element and said throttle and a throttle closing wire operatively connected between said control element and said throttle, actuator means for automatically positioning said throttle, and actuator means being operative to drive an actuator element rotatable relative to said control element, and means for providing a lost motion connection between said actuator element and said control element for permitting movement of said control element independently of said actuator element and for operation of said control element by said actuator element upon movement of said actuator element by said actuator means.

* * * * *

UNITED STATES PATENT AND TRADEMARK OFFICE
CERTIFICATE OF CORRECTION

PATENT NO. : 4,611,561
DATED : September 16, 1986
INVENTOR(S) : Koji Suyama

It is certified that error appears in the above-identified patent and that said Letters Patent is hereby corrected as shown below:

Column 1, line 67, "motorocycle" should be --motorcycle--.

Column 2, line 55, "crresponding" should be --corresponding--.

Column 4, line 12, "76" should be --66--.

Column 6, line 34, Claim 5, after "and" insert --a--.

Column 6, line 41, Claim 5, "and" should be --said--.

Signed and Sealed this

Thirty-first Day of March, 1987

Attest:

DONALD J. QUIGG

*Attesting Officer*   *Commissioner of Patents and Trademarks*